United States Patent [19]
Leister

[11] 3,787,160
[45] Jan. 22, 1974

[54] APPARATUS HAVING EXTRUSION AND MIXING ZONES

[75] Inventor: Karl Leister, Krefeld, Germany

[73] Assignee: Bayer Aktiengesellschaft, Leverkusen, Germany

[22] Filed: Sept. 11, 1972

[21] Appl. No.: 288,222

Related U.S. Application Data

[63] Continuation of Ser. No. 69,486, Sept. 3, 1970, abandoned, which is a continuation-in-part of Ser. No. 1,678, Jan. 9, 1970, abandoned.

[52] U.S. Cl. .................................. 425/208, 425/376
[51] Int. Cl. ............................................. B29f 3/02
[58] Field of Search .... 425/202, 203, 208, 381, 376

[56] References Cited
UNITED STATES PATENTS

| | | | |
|---|---|---|---|
| 2,617,167 | 11/1952 | Johnson | 264/177 R X |
| 2,902,923 | 9/1959 | Stacy | 425/381 X |
| 3,023,455 | 3/1962 | Geier et al. | 425/208 |
| 3,035,304 | 5/1962 | Reifenhauser | 259/191 |
| 3,225,715 | 12/1965 | Page | 425/203 X |
| 3,285,200 | 11/1966 | Slaybaugh et al. | 425/202 |
| 3,535,737 | 10/1970 | Hendry | 425/203 X |
| 3,563,514 | 2/1971 | Shattuck | 425/203 X |

FOREIGN PATENTS OR APPLICATIONS

| | | |
|---|---|---|
| 920,138 | 3/1963 | Great Britain ................ 415/74 |
| 1,248,798 | 1/1960 | France |
| 989,330 | 4/1965 | Great Britain |
| 1,255,915 | 1/1963 | Germany |

Primary Examiner—R. Spencer Annear
Attorney, Agent, or Firm—Frank M. Murphy

[57] ABSTRACT

Apparatus for extruding and mixing of material comprising an extrusion zone, into which the material is introduced, and a mixing zone, into which the material is extruded. In the mixing zone, a core member and a worm helix are driven independently of each other and mix the material and advance it to the discharge nozzle of the machine.

11 Claims, 4 Drawing Figures

PATENTED JAN 22 1974 3,787,160

A-A

KARL LEISTER
INVENTOR.

BY
Burges, Dinklage + Sprung

APPARATUS HAVING EXTRUSION AND MIXING ZONES

This is a continuation of application Ser. No. 69,486 filed Sept. 3, 1970, which is a continuation-in-part of Ser. No. 1678, filed Jan. 9, 1970 both now abandoned.

The present invention relates to an extruder, and particularly to an extruder for plasticising synthetic plastics compositions and for the moulding thereof into continuous shaped elements, films or the like.

One problem which exists with extruders is that the plasticised composition consisting of synthetic plastics must be made very homogenous. In addition, any other components which may have to be admixed therewith, e.g. dyestuffs, blowing agents, plasticisers or the like, have to be dispersed in the composition as homogeneously as possible.

Various different solutions to this problem have already been attempted. One such solution to the problem of how to produce a sufficient homogeneity with different compositions consisting of synthetic plastics, has been to introduce the additives into the plastic composition in a separate working step in another machine, before the final processing could take place. Another solution has been to use a long screw in the extruder with a specially developed kneading zone. The manufacture of the screw is naturally extremely difficult and very complicated, and does not prevent overheating of heat-sensitive additives.

It has now been found that the problem of an adequate homogenisation of the plastic composition and of the additives which may be included can be achieved by arranging a mixing and reaction screw machine between the worm and the outlet nozzle of the extruder, the said machine consisting of a horizontal single-cylinder or multi-cylinder housing, in which one or more juxtaposed and intermeshing screws are arranged to revolve coaxially, the screw helix and screw core being separate from one another and being adapted to be driven independently of one another.

The result thereby achieved is that, independently of the speed of rotation of the extruder worm, the mass of synthetic plastics material can be homogenized after emerging from the region of the extruder worm and other additives can also be added in an advantageous manner after the plasticisation step through separate supply openings in the region of the mixing and reaction screw machine. It is possible in this way for the introduction of the temperature-sensitive additives to be delayed until after the synthetic plastic mass has been plasticised in the extruder. In this way it is possible to avoid overheating of the additives in the plasticisation zone.

A screw-type extrusion press is already known from German Patent Specification No. 1,255,915, in which the screw helix and screw core can be driven in rotation independently of one another in the region of the intake zone, the screw helix being advantageously compressible. A similar construction of screw-type extrusion press has already been described in German Patent Specification No. 592,399. With both of these known extrusion presses, however, the object is to produce a better filling of the main screw or worm, that is to say, what is involved is exclusively an intake screw used as a charging and conveying member.

In contrast, the object of the present invention, as already mentioned, is to provide for a mixing and homogenising operation to take place at the end of the extruder screw, optionally with initiation of a reaction.

According to one particular embodiment of the invention, the screw core of the mixing and reaction screw machine is a short extension member of the core of the extruder screw. The construction of this embodiment is particularly expedient. Alternatively, the screw helix of the mixing and reaction screw machine may be an extension of the worm pitch of the extruder screw. Another equivalent solution is for the mixing and reaction screw machine to be an independent component adapted to be screwed on to the extruder housing.

Advantageously the screw core has a conveyor thread, in order to make it possible to extrude against relatively high pressure. It is further proposed to provide the screw core with a return thread, in order to obtain better mixing.

The extruder according to the invention is diagrammatically illustrated by way of three embodiments shown in longitidinal section in the accompanying drawings.

Figure 1:
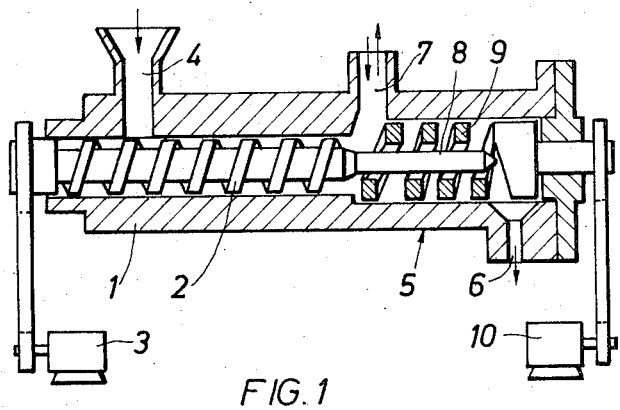
FIGS. 1 to 3 show the three different embodiments.

An extruder housing 1 contains within it an extruder worm or screw 2, which is driven by drive means 3. Granulated material is fed to the extruder screw 2 by way of a supply device 4. Immediately after the extruder screw there is a mixing and reaction machine 5 having an outlet nozzle 6. The mixing and reaction machine 5 comprises a supply opening 7 for other additives and this opening simultaneously serves as a gas-vent. The core member or screw core 8 of the reaction machine is formed as a short extension member of the extruder worm 2. The worm helix 9 can be driven independently thereof and is operated by drive means 10.

Figure 2:
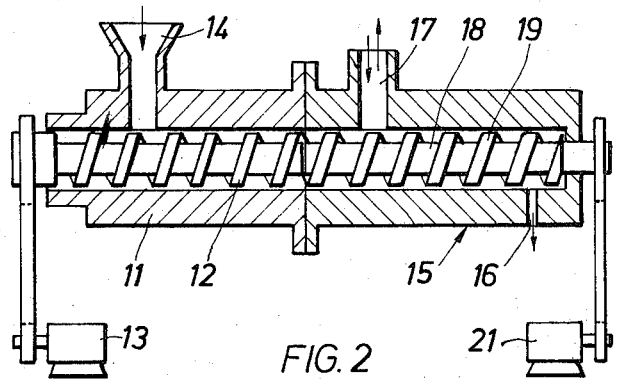

In FIG. 2, an extruder screw 12, is driven by drive means 13 so that it rotates in extruder housing 11. Granulated material is fed through a supply device 14 to the extruder screw 12. Directly after the extruder screw 12 is a mixing and reaction machine 15, which has a supply opening 17 for other additives, and this opening simultaneously serves as a gas-vent. A screw helix 19 is formed as a coreless extension of the worm pitch of the extruder screw 12. The screw core 18 of the mixing and reaction machine can be driven independently thereof by drive means 21.

Figure 3:
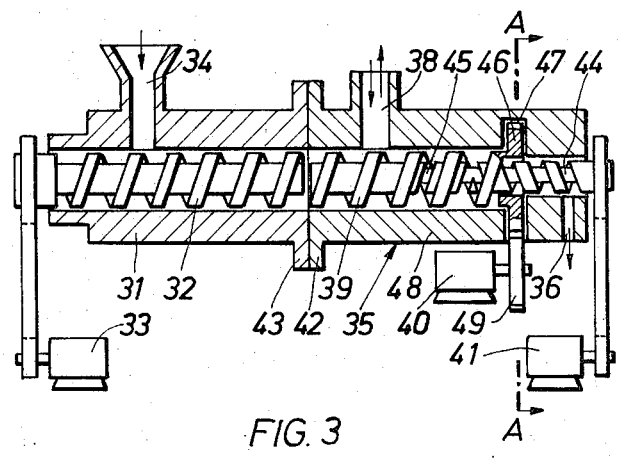

In FIG. 3, a extruder screw 32 is driven by drive means 33 and rotates in an extruder housing 31. Granulated material is fed to the extruder screw 32 through a supply device 34.

Immediately after the extruder screw 32 is a mixing and reaction machine 35, which has an outlet nozzle 36. The mixing and reaction machine 35 is detachably screwed by means of a flange 42 on to a flange 43 of the extruder housing 31. The screw core 38 is driven by drive means 41 and has on its surface an ordinary conveyor screw thread 44 which enables the material to be conveyed against relatively high pressure. A return thread 45 ensures a more intensive mixing of the material. A screw spiral 39 is fixed on a gearwheel 46 which rotates in a recess 47 in a housing 48 of the mixing and reaction machine 35. The gearwheel 46 meshes with the gearwheel 49 which is connected to the drive means 40.

Figure 4:
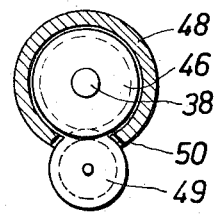
FIG. 4 is a section on the line A—A of FIG. 3.

FIG. 4 is a section taken along line A—A of FIG. 3 and shows the gearwheel 46 rotating in the recess 47 in the housing 48. The gearwheel 49 meshes with the gearwheel 46 and rotates in the recess 50.

It is to be understood that in all constructional examples the rotating parts are provided with suitable packings (not shown) relatively to the stationary parts.

In the embodiment of FIG. 1, the worm helix 9 rotates so as to advance the material toward the outlet nozzle 6, and thus the worm helix 9 and the screw core 8 rotate in the same direction. The respective speeds of rotation of the worm helix 9 and screw core 8 is selected to provide optimum mixing or reaction, as the case may be, for the particular material being worked, and can readily be determined by experiment for the particular conditions applying.

In the embodiment of FIG. 2, the worm helix 19 and screw core 18 can be rotated in the same or opposite direction and the relative direction and respective speeds can be determined experimentally as explained in reference to the embodiment of FIG. 1.

In the embodiment of FIG. 3, as shown, the worm helix 39 and screw core 38 rotate in opposite directions, with the return thread 45 moving material toward the inlet 34 and the conveyor thread advancing material toward the discharge nozzle 36.

What is claimed is:

1. Apparatus for extruding and mixing of material comprising:
   a. an elongated housing having an axially extending passageway therein, an inlet opening adjacent one end of the housing for introduction of feed material into said passageway and a discharge nozzle adjacent the other end of the housing for discharge of the extruded and mixed material,
   b. an extrusion zone defined by an extrusion screw extending through the passageway from the inlet end thereof to termination at an intermediate point between the inlet opening and discharge nozzle, and the housing disposed about the extrusion screw, the housing about the extrusion screw being cylindrical for confining material to the screw for the extrusion thereof, for plasticization of a plastic composition in the extrusion zone,
   c. a mixing zone defined by mixing means within the passageway, said mixing means comprising a core member and a worm helix disposed about the core member extending from adjacent said termination of the extrusion screw to adjacent the discharge nozzle, for simultaneously mixing and advancing the material toward the discharge opening,
   d. said core member and worm helix being mounted in the housing for rotation independent of each other.

2. Apparatus according to claim 1, said extrusion screw comprising a core and a worm helix, the core member of the mixing means being an extension of the extruder screw core.

3. Apparatus according to claim 1, said extrusion screw comprising a core and a worm helix, the worm helix of the mixing means being an extrusion of the worm helix of the extension screw.

4. Apparatus according to claim 1, wherein the core member comprises a conveyor thread for advancing material in the mixing means toward the discharge nozzle.

5. Apparatus according to claim 1, wherein the core member comprises a return thread for advancing material in the mixing means toward the extruder inlet opening.

6. Apparatus according to claim 4, wherein the core member comprises a return thread for advancing material in the mixing means toward the extruder inlet opening, disposed on the extruder inlet opening side of the conveyor thread.

7. Apparatus according to claim 1, said core member and worm helix being mounted within the housing for rotation independent of the extrusion screw.

8. Apparatus according to claim 7, wherein the core member comprises a conveyor thread for advancing material in the mixing means toward the discharge nozzle.

9. Apparatus according to claim 8, wherein the core member comprises a return thread for advancing material in the mixing means toward the extruder inlet opening, disposed on the extruder inlet opening side of the conveyor thread.

10. Apparatus according to claim 1, and means defining an opening in the housing for introduction or removal of material from the mixing means.

11. Apparatus according to claim 1, and means for driving the core member, and means for driving the worm helix independently of driving of the core member.

* * * * *

PO-1050
(5/69)

UNITED STATES PATENT OFFICE
CERTIFICATE OF CORRECTION

Patent No. 3,787,160            Dated January 22, 1974

Inventor(s) Karl Leister

It is certified that error appears in the above-identified patent and that said Letters Patent are hereby corrected as shown below:

The precis, add:

-- [30]    Foreign Application Priority Data
       February 1, 1969    Germany..............P 19 05 104.8-

Signed and sealed this 17th day of September 1974.

(SEAL)
Attest:

McCOY M. GIBSON JR.            C. MARSHALL DANN
Attesting Officer              Commissioner of Patents